US007719794B2

(12) United States Patent
Hanyu et al.

(10) Patent No.: US 7,719,794 B2
(45) Date of Patent: May 18, 2010

(54) HEAD, HEAD SUSPENSION ASSEMBLY, AND DISK DEVICE PROVIDED WITH THE SAME

(75) Inventors: Mitsunobu Hanyu, Hamura (JP); Kan Takahashi, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/359,955

(22) Filed: Jan. 26, 2009

(65) Prior Publication Data
US 2009/0310258 A1    Dec. 17, 2009

(30) Foreign Application Priority Data
Jun. 12, 2008    (JP)    .............................. 2008-154260

(51) Int. Cl.
   *G11B 5/60*    (2006.01)
(52) U.S. Cl. ................................. 360/235.6; 360/236.3
(58) Field of Classification Search .............. 360/235.4, 360/235.5, 235.6, 235.7, 235.8, 235.9, 236.1, 360/236.3
   See application file for complete search history.

(56) References Cited

U.S. PATENT DOCUMENTS

| | | | | |
|---|---|---|---|---|
| 5,508,862 | A * | 4/1996 | Lazzari et al. ............. | 360/236.4 |
| 6,349,018 | B2 * | 2/2002 | Koishi et al. .............. | 360/236.3 |
| 6,424,493 | B1 * | 7/2002 | Matsumoto et al. ....... | 360/235.5 |
| 6,462,909 | B1 * | 10/2002 | Boutaghou et al. ........ | 360/235.8 |
| 6,483,667 | B1 * | 11/2002 | Berg et al. ................ | 360/235.6 |
| 6,515,831 | B1 * | 2/2003 | Sannino et al. ........... | 360/235.6 |
| 6,529,346 | B2 * | 3/2003 | Otsuka ..................... | 360/235.8 |
| 6,927,942 | B2 * | 8/2005 | Tani et al. ................. | 360/235.6 |
| 6,999,282 | B2 * | 2/2006 | Rao ........................... | 360/236 |
| 7,042,678 | B2 * | 5/2006 | Tsuchiyama et al. ..... | 360/235.8 |
| 7,245,455 | B2 * | 7/2007 | Rajakumar ............... | 360/235.8 |
| 7,262,937 | B2 * | 8/2007 | Pendray et al. ........... | 360/235.1 |
| 7,505,228 | B2 * | 3/2009 | Hanyu ...................... | 360/235.6 |
| 7,614,137 | B2 * | 11/2009 | Taniguchi et al. ........ | 29/603.12 |

(Continued)

FOREIGN PATENT DOCUMENTS

JP    11-16141    1/1999

(Continued)

OTHER PUBLICATIONS

Japanese Office Action (w/English translation), Appln No. 2008-154260, dated May 19, 2009.

*Primary Examiner*—Brian E Miller
(74) *Attorney, Agent, or Firm*—Patterson & Sheridan, LLP

(57) ABSTRACT

According to an embodiment, a slider of a head comprises a negative-pressure cavity formed in a facing surface, a leading step portion situated on an inflow side of the negative-pressure cavity, a pair of side portions opposed to each other, a trailing step portion situated on an outflow side of the negative-pressure cavity, a leading pad provided on an end portion of the leading step portion on the negative-pressure cavity side, and a plurality of recesses formed on the inflow side of the leading pad and individually opening in the inflow-side end face. The leading step portion includes a main step portion which is situated beside the inflow side of the leading pad and extends in a second direction, and at least one extended step portion extending transversely to the second direction from the main step portion toward the inflow side and situated between the recesses.

6 Claims, 5 Drawing Sheets

U.S. PATENT DOCUMENTS

| | | | |
|---|---|---|---|
| 7,616,405 B2 * | 11/2009 | Hu et al. | 360/236.2 |
| 2002/0001157 A1 * | 1/2002 | Kang et al. | 360/236.3 |
| 2002/0008940 A1 * | 1/2002 | Jang et al. | 360/236.3 |
| 2002/0075600 A1 * | 6/2002 | Schnur et al. | 360/235.8 |
| 2006/0238922 A1 | 10/2006 | Hanyu | |
| 2006/0268460 A1 | 11/2006 | Kondo | |
| 2007/0121238 A1 | 5/2007 | Kondo et al. | |
| 2007/0188925 A1 * | 8/2007 | Ishihara | 360/235.8 |

FOREIGN PATENT DOCUMENTS

| | | |
|---|---|---|
| JP | 2003-123422 | 4/2003 |
| JP | 2008-16069 | 1/2008 |

* cited by examiner

HEAD, HEAD SUSPENSION ASSEMBLY, AND DISK DEVICE PROVIDED WITH THE SAME

CROSS-REFERENCE TO RELATED APPLICATIONS

This application is based upon and claims the benefit of priority from Japanese Patent Application No. 2008-154260, filed Jun. 12, 2008, the entire contents of which are incorporated herein by reference.

BACKGROUND

1. Field

One embodiment of the present invention relates to a head used in a disk device such as a magnetic disk device, a head suspension assembly provided with the head, and a disk device provided with the head suspension assembly.

2. Description of the Related Art

A disk device, e.g., a magnetic disk device, includes a magnetic disk, spindle motor, magnetic head, and carriage assembly. The magnetic disk is arranged in a case. The spindle motor supports and rotates the disk. The magnetic head writes and reads information to and from the disk. The carriage assembly supports the head for movement with respect to the disk. The carriage assembly includes a rockably supported arm and a suspension extending from the arm. The magnetic head is supported on an extended end of the suspension. The head includes a slider attached to the suspension and a head portion on the slider. The head portion is constructed including a reproducing element for reading and a recording element for writing.

As modern magnetic disk devices have become smaller and smaller, their application to mobile equipment has spread more widely. The magnetic disk devices for mobile application require operation shock resistance and high height security. The slider has a facing surface (air bearing surface (ABS)) that is opposed to a recording surface of the magnetic disk. A predetermined head load directed to a magnetic recording layer of the disk is applied to the slider by the suspension.

When the magnetic disk device operates, air-flows are produced between the disk in rotation and the slider. Based on the principle of aerodynamic lubrication, a force (positive pressure) to fly the slider above the recording surface of the disk acts on the facing surface of the slider. By deliberately shaping the facing surface of the slider to balance this flying force with the head load, the slider can be flown stably with an infinitesimal gap of about 10 nm above the recording surface of the disk without contacting the disk surface. Thus, high-density recording, high-speed data access, and high reliability are achieved by the magnetic head.

The design of the facing surface of the slider is essential to the attainment of the operation shock resistance and height security of the magnetic head described above. The "height security" implies prevention of a reduction in the flying height of the slider under a reduced-pressure environment, and it will hereinafter be referred to as reduced-pressure performance. In order to improve the operation shock resistance and the reduced-pressure performance, it is important to make the slider hard to be separated from the disk surface when jolted and to prevent the flying height from being reduced during decompression.

As described in, for example, Jpn. Pat. Appln. KOKAI Publication No. 2003-123422, there is a known disk device in which a negative-pressure cavity or a dynamic-pressure producing groove is formed near the center of a facing surface of a slider in order to prevent variation of the flying height of the slider. Specifically, the slider includes a negative-pressure groove formed at the central part of an ABS, a leading step provided on the inflow-end side of the slider, and a trailing step on the outflow-end side of the slider, and a magnetic head is provided on the trailing step.

The leading step is provided with a leading pad for use as a pressure producing pad. The leading pad is formed narrow so that the negative-pressure cavity is as large as possible on the inflow side of the slider. In order to increase a pressure produced by the leading pad, moreover, step portions of different depths are formed on the inflow side of the leading pad. Gaps between the disk surface and the step portions gradually narrow toward the leading pad.

Although the operation shock resistance and the reduced-pressure performance can be improved by deliberately shaping the facing surface of the slider in the aforesaid manner, a higher pressure should preferably be produced by trapping more air. If the slider is skewed, moreover, the pressure that is produced by the leading pad to act on air-flows cannot be enhanced.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a head comprises: a slider which includes a facing surface opposed to a surface of a rotatable recording medium, an inflow-side end face extending transversely to the facing surface, and an outflow-side end face extending transversely to the facing surface and is configured to be flown by an air-flow which is produced between the recording medium surface and the facing surface as the recording medium rotates; and a head portion provided on the slider and configured to record and reproduce information to and from the recording medium. The facing surface of the slider includes a first direction along the air-flow and a second direction perpendicular to the first direction, the slider comprises a negative-pressure cavity which is defined by a recess formed in the facing surface and produces a negative pressure; a leading step portion projecting with respect to the negative-pressure cavity and situated on the inflow side of the negative-pressure cavity with respect to the air-flow; a pair of side portions projecting with respect to the negative-pressure cavity, extending in the first direction from the leading step portion toward an outflow-side end of the slider, and opposed to each other with a space therebetween in the second direction; a trailing step portion projecting with respect to the negative-pressure cavity, situated on the outflow side of the negative-pressure cavity with respect to the air-flow, and having a top surface opposed to the recording medium; a leading pad provided on an end portion of the leading step portion on the negative-pressure cavity side; and a plurality of recesses which are formed on the inflow side of the leading pad and individually open in the inflow-side end face, the leading step portion including a main step portion which is situated beside the inflow side of the leading pad and extends in the second direction, and at least one extended step portion extending transversely to the second direction from the main step portion toward the inflow side and situated between the recesses.

A first embodiment in which a disk device according to this invention is applied to a hard disk drive (HDD) will now be described in detail with reference to the accompanying drawings.

Figure 1:
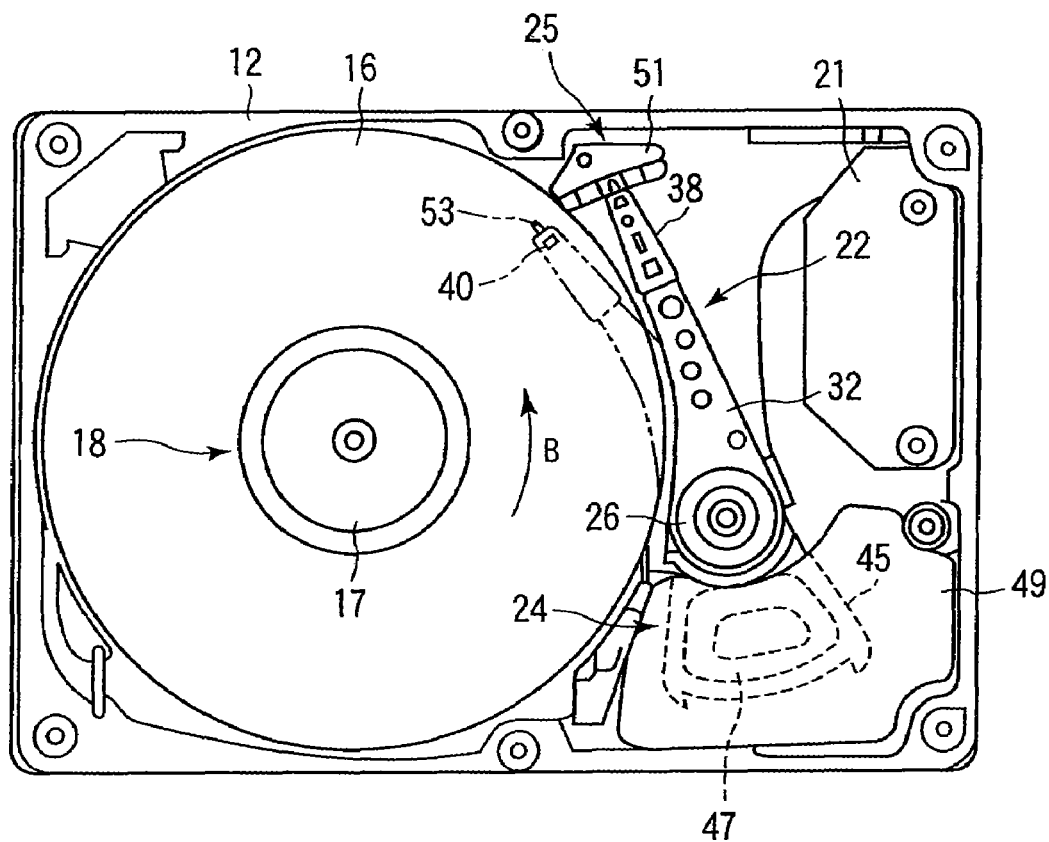
FIG. 1 is an exemplary plan view showing an HDD according to a first embodiment of the invention.

FIG. 1 shows the internal structure of the HDD with a top cover of its housing off. As shown in FIG. 1, the HDD includes a case 12 in the form of an open-topped rectangular box and a top cover (not shown). The top cover is fastened to the case by screws so as to close the top opening of the case.

The case 12 contains a magnetic disk 16, spindle motor 18, magnetic heads 40, carriage assembly 22, voice coil motor (VCM) 24, ramp load mechanism 25, board unit 21, etc. The magnetic disk 16 serves as a recording medium. The spindle motor 18 serves as a drive section that supports and rotates the disk. The magnetic heads write and read information to and from the disk. The carriage assembly 22 supports the heads for movement with respect to the disk 16. The VCM 24 rocks and positions the carriage assembly. The ramp load mechanism 25 holds the magnetic heads in a retracted position at a distance from the magnetic disk when the heads are moved to the outermost periphery of the disk. The board unit 21 includes a head IC and the like.

A printed circuit board (not shown) is screwed to the outer surface of a bottom wall of the case 12. The circuit board controls the operations of the spindle motor 18, VCM 24, and magnetic heads 40 through the board unit 21.

The magnetic disk 16 has magnetic recording layers on its upper and lower surfaces, individually. Further, a lubricant, such as oil, is spread to a thickness of about 1 nm on a surface of the magnetic disk 16. The disk 16 is fitted on a hub (not shown) of the spindle motor 18 and fixed on the hub by a clamp spring 17. If the motor 18 is driven, the disk 16 is rotated at a predetermined speed of, for example, 4,200 rpm in the direction of arrow B.

The carriage assembly 22 is provided with a bearing portion 26, which is fixed on the bottom wall of the case 12, and arms 32 that extend from the bearing portion. The arms 32 are situated parallel to the surfaces of the magnetic disk 16 and spaced apart from one another. Further, the arms 32 extend in the same direction from the bearing portion 26. The carriage assembly 22 is provided with suspensions 38 that are elastically deformable, elongated plates. Each suspension 38 is formed of a leaf spring, of which the proximal end is fixed to the distal end of its corresponding arm 32 by spot welding or adhesive bonding and which extends from the arm. Alternatively, each suspension 38 may be formed integrally with its corresponding arm 32. The arm 32 and the suspension 38 constitute a head suspension, and the head suspension and the magnetic heads 40 constitute a head suspension assembly.

Figure 2:
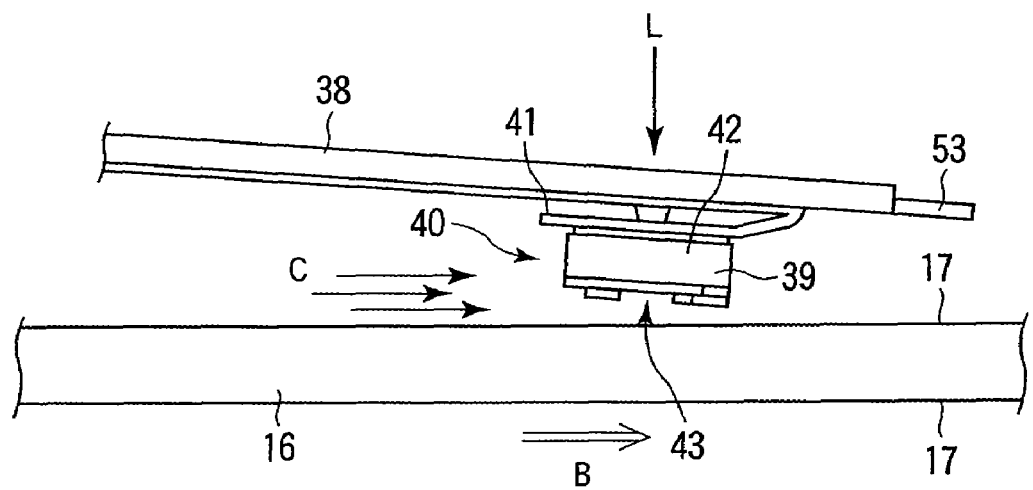
FIG. 2 is an exemplary enlarged side view showing a magnetic head portion of the HDD.

As shown in FIG. 2, each magnetic head 40 includes a slider 42 substantially in the shape of a rectangular parallelepiped and a read/write head portion 39 on the slider. The head 40 is fixed to a gimbal spring 41 that is provided on the distal end portion of each suspension 38. Each magnetic head 40 is subjected to a head load L that is directed to a surface of the magnetic disk 16 by the elasticity of the suspension 38.

As shown in FIG. 1, the carriage assembly 22 includes a support frame 45 that extends from the bearing portion 26 oppositely from the arms 32. The support frame supports a voice coil 47 that constitutes a part of the VCM 24. The support frame 45 is molded from plastic and formed integrally on the outer periphery of the voice coil 47. The coil 47 is situated between a pair of yokes 49 that are fixed on the case 12 and, in conjunction with these yokes and a magnet (not shown) fixed to one of the yokes, constitutes the VCM 24. If the voice coil 47 is energized, the carriage assembly 22 rocks around the bearing portion 26, whereupon each magnetic head 40 is moved to and positioned in a region over a desired track of the magnetic disk 16.

The ramp load mechanism 25 includes a ramp 51 and tabs 53. The ramp 51 is provided on the bottom wall of the case 12 and located outside the magnetic disk 16. The tabs 53 extend individually from the respective distal ends of the suspensions 38. As the carriage assembly 22 rocks to its retracted position outside the disk 16, each tab 53 engages with a ramp surface on the ramp 51 and is then pulled up along the slope of the ramp surface, whereupon each magnetic head 40 is unloaded.

Figures 3, 4:
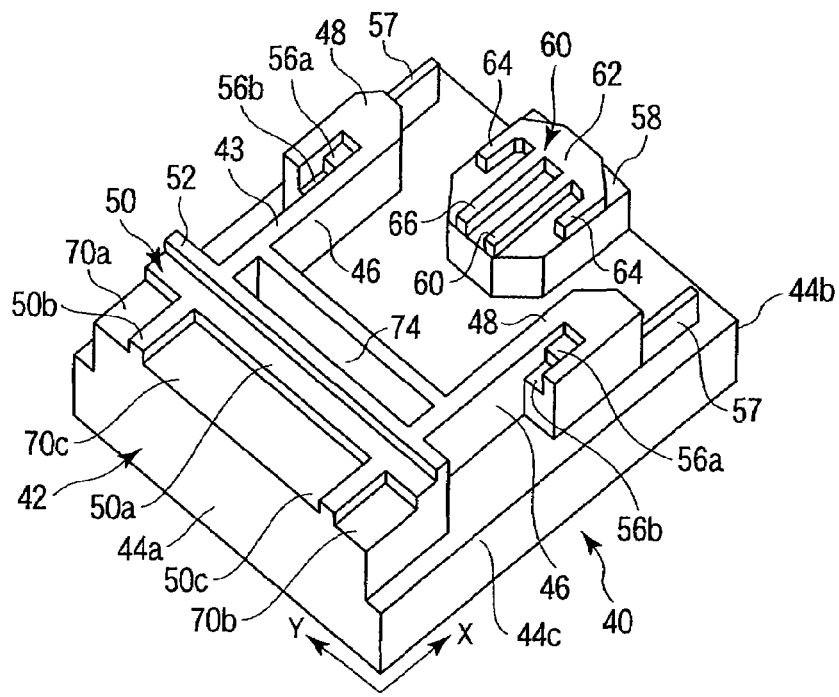
FIG. 3 is an exemplary perspective view showing the disk-facing surface side of a slider of the magnetic head.
FIG. 4 is an exemplary plan view showing the disk-facing surface side of the slider.

The following is a detailed description of a configuration of each magnetic head 40. FIG. 3 is a perspective view showing the disk-facing surface side of the slider that constitutes the magnetic head, FIG. 4 is a plan view of the slider, and FIG. 5 is a sectional view of the slider.

Figure 5:
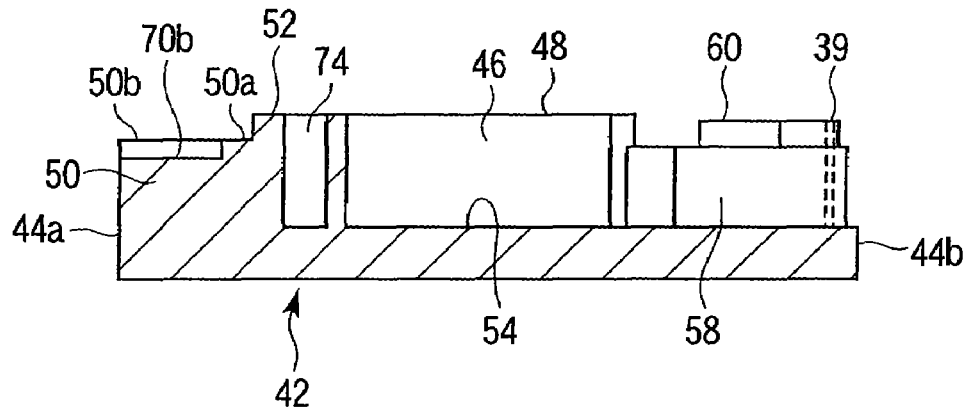
FIG. 5 is an exemplary sectional view taken along line V-V of FIG. 4.

As shown in FIGS. 3 to 5, the magnetic head 40 includes the slider 42 that is substantially in the shape of a rectangular parallelepiped. The slider has a rectangular disk-facing surface (ABS) 43, an inflow-side end face 44a, an outflow-side end face 44b, and a pair of side faces 44c. The disk-facing surface 43 faces a surface of the magnetic disk 16. The inflow- and outflow-side end faces 44a and 44b extend at right angles to the disk-facing surface. The side faces 44c extend between the end faces 44a and 44b and at right angles to the disk-facing surface.

The longitudinal direction of the disk-facing surface 43 is supposed to be a first direction X, and the transverse direction perpendicular thereto to be a second direction Y. The slider 42 is formed as a so-called femto slider, having a length L of 1.25 mm or less, e.g., 0.85 mm, in the first direction X and a width W of 1.00 mm or less, e.g., 0.70 mm, in the second direction Y.

The magnetic head 40 is constructed as a flying head, in which the slider 42 is flown by air-flows C (see FIG. 2) that are produced between the disk surface and the disk-facing surface 43 as the magnetic disk 16 rotates. When the HDD is operating, the disk-facing surface 43 of the slider 42 never fails to be opposed to the disk surface with a gap therebetween. The direction of the air-flows C is coincident with the direction of rotation B of the magnetic disk 16. The slider 42 is located so that the first direction X of the disk-facing surface 43 opposed to the surface of the disk 16 is substantially coincident with the direction of the air-flows C.

As shown in FIGS. 3 to 5, a negative-pressure cavity 54 is formed ranging from the substantial center of the disk-facing surface 43 to the outflow-end side. The cavity 54 is a recess that opens toward the outflow-side end face 44b. The slider 42 is formed to be, for example, 0.23 mm thick, and the cavity 54 to be 800 to 1,500 nm, e.g., 1,500 nm, deep. The negative-pressure cavity 54 serves to produce a negative pressure on the central part of the disk-facing surface 43 at every feasible yaw angle for the HDD.

A substantially rectangular leading step portion 50 is formed on the inflow-side end portion of the disk-facing surface 43. The leading step portion 50 projects above the bottom surface of the negative-pressure cavity 54 so as to be one level lower than the disk-facing surface 43 and is situated on the inflow side of the cavity 54 with respect to the air-flows C. The leading step portion 50 extends substantially throughout the area of the slider 42 in the second direction.

In order to maintain the pitch angle of the magnetic head 40, a leading pad 52 that utilizes an air film to support the slider 42 protrudes from the leading step portion 50. The leading pad 52 is an elongated band that extends continuously throughout the area that covers the width of the leading step portion 50 in the second direction Y. The pad 52 is formed in a position deviated on the downstream side from the inflow-side end face 44a of the slider 42, that is, along the downstream-side end of the leading step portion 50. The leading pad 52 is formed so that its width in the first direction is 30 μm or less. The top surface of the leading pad 52 forms the disk-facing surface 43.

At the leading step portion 50, recesses 70a, 70b and 70c that are one level deeper than the leading step portion are formed on the inflow side of the leading pad 52. These recesses 70a, 70b and 70c are rectangular, for example, and are arranged side by side in the second direction Y. The recess 70a opens in a side face of the leading step portion 50 and the inflow-side end face 44a. The recess 70c opens in the opposite side face of the leading step portion 50 and the inflow-side end face 44a. The recess 70b is situated between the recesses 70a and 70c and opens in the inflow-side end face 44a.

The leading step portion 50 includes an elongated, band-like main step portion 50a and two band-like extended step portions 50b and 50c. The main step portion 50a is situated beside the inflow side of the leading pad 52 and extends in the second direction Y. The extended step portions 50b and 50c individually extend transversely to the second direction Y from the main step portion toward the inflow side. The extended step portion 50b extends in the first direction X from the main step portion 50a to the inflow-side end face 44a and is situated between the recesses 70a and 70b. The extended step portion 50c extends in the first direction X from the main step portion 50a to the inflow-side end face 44a and is situated between the recesses 70b and 70c. The extended step portions 50b and 50c and the recesses 70a, 70b and 70c are formed symmetrically with respect to a central axis D of the slider 42.

The disk-facing surface 43 is formed with a pair of side portions 46 that extend along the side edges of the surface 43 and are opposed to each other with a space in the second direction Y between them. The side portions 46 protrude from the bottom surface of the negative-pressure cavity 54. The side portions 46 extend from the leading step portion 50 toward the downstream end of the slider 42. The leading step portion 50 and the pair of side portions 46 are located symmetrically with respect to the central axis D of the slider 42. As a whole, they are formed to be substantially U-shaped, closed on the inflow side and open to the downstream side. The leading step portion 50 and the side portions 46 define the negative-pressure cavity 54.

A side pad 48 is formed on each side portion 46 and leads to the leading pad 52. The pads 52 and 48 are formed substantially flat and form the disk-facing surface 43.

A first recess 56a and a second recess 56b are formed continuously in each side pad 48. The first and second recesses 56a and 56b open toward the inflow-side end of the disk-facing surface 43 as well as toward the magnetic disk surface. Each of the recesses 56a and 56b has a rectangular shape defined by a pair of side edges, which extend substantially parallel to the first direction X, and a bottom edge, which connects the respective extended ends of the side edges and extends substantially parallel to the second direction Y. The second recess 56b is one level deeper than the first recess 56a.

The disk-facing surface 43 of the slider 42 is formed with a pair of skirt portions 57 that individually extend straight in the first direction X from the side portions 46 toward the outflow-side end of the slider. Each skirt portion 57 is formed to be deeper than each side portion 46 and projects above the bottom surface of the negative-pressure cavity 54. Each skirt portion 57 is formed at a depth of, for example, 100 to 200 nm below the disk-facing surface 43.

Between the pair of side portions 46, a pocket recess 74 is formed between the leading pad 52 and an inflow-side end of the negative-pressure cavity 54. The pocket recess 74 has the shape of an elongated band that extends between the side portions 46 in the second direction Y. The recess 74 is substantially equal in depth to the cavity 54.

The slider 42 includes a trailing step portion 58 that is formed on the outflow-side end portion of the disk-facing surface 43 with respect to the air-flows C. The trailing step portion 58 projects above the bottom surface of the negative-pressure cavity 54, and the height of its projection is equal to that of the leading step portion 50. In other words, the trailing step portion 58 is formed so that its depth below the disk-facing surface 43 is equal to that of the leading step portion 50, that is, 50 to 250 nm, e.g., 100 nm. The trailing step portion 58 is situated on the downstream side of the negative-pressure cavity 54 with respect to the air-flows C and substantially in the center of the disk-facing surface 43 with respect to the second direction Y. Further, the trailing step portion 58 is slightly deviated from the outflow-side end face 44b of the slider 42 toward the inflow-side end face 44a.

As shown in FIGS. 3 to 5, the trailing step portion 58 is substantially in the shape of a rectangular parallelepiped, of which two corner portions on the upstream side are chamfered. The trailing step portion 58 has a top surface that faces the magnetic disk surface 16.

A trailing pad 60 that utilizes an air film to support the slider 42 protrudes from the top surface of the trailing step portion 58. The trailing pad 60 is formed flush with the leading pad 52 and the side pads 48, and its surface constitutes the disk-facing surface 43.

The trailing pad 60 includes a substantially rectangular base portion 62, a pair of wing portions 64 that extend in the second direction Y from the base portion to opposite sides, and a pair of extended portions 66 that extend in the first direction X from the base portion 62 toward the inflow-end side. On the trailing step portion 58, the base portion 62 is provided on the central axis D at the outflow-end side and situated substantially in the center with respect to the second direction Y. Each wing portion 64 extends in the first direction X from each end of the base portion 62 to the inflow-end side of the slider 42. The two extended portions 66 individually extend in the first direction X and face each other with a gap between them. The extended portions 66 are equal in length in the first direction X and extend to the inflow-side end edge of the trailing step portion 58.

As shown in FIG. 5, the head portion 39 of the magnetic head 40 includes a recording element and a reproducing element, which record or reproduce information to or from the magnetic disk 16. The reproducing and recording elements are embedded in the downstream end portion of the slider 42 with respect to the air-flows C. The reproducing and recording elements have a read/write gap (not shown) that is defined in the trailing pad 60.

According to the HDD and the head suspension assembly constructed in this manner, the magnetic head 40 is flown by the air-flows C that are produced between the disk surface and the disk-facing surface 43 as the magnetic disk 16 rotates. When the HDD is operating, therefore, the disk-facing surface 43 of the slider 42 never fails to be opposed to the disk surface with a gap therebetween. As shown in FIG. 2, the magnetic head 40 flies in an inclined posture such that the read/write gap of the head portion 39 is located closest to the disk surface.

Since the disk-facing surface 43 of the slider 42 is provided with the negative-pressure cavity 54, the magnetic head 40 can produce a negative pressure on the central part of the surface 43 at every feasible yaw angle for the HDD. Since the leading pad 52 is narrow, moreover, the negative-pressure cavity 54 can be located on the inflow-end side of the slider, so that the operation shock resistance is improved. Since the pocket recess 74 is sufficiently large, furthermore, more air can be trapped into that part and guided to the downstream side of the slider on which the trailing pad 60 is located.

A pressure produced by the leading pad 52 can be increased, since the leading step portion 50 and the recesses 70a, 70b and 70c are provided on the inflow side of the leading pad 52 so that their depths are different and that gaps between the disk surface and them gradually narrow. Thus, reduction of the pitch angle of the slider can be suppressed.

Further, the leading step portion 50 includes the extended step portions 50b and 50c that extend from the main step portion 50a to the inflow-side end face, and the recesses 70a, 70b and 70c are provided individually on the opposite sides of the extended step portions with respect to the second direction Y. With this arrangement, introduced air can be confined to the leading step portion and efficiently guided to the leading pad, so that the efficiency of pressure production by the leading pad can be improved. As indicated by arrow F in FIG. 4, furthermore, the extended step portions 50b and 50c and the recesses 70a and 70c can fully trap even those air-flows which are skewed with respect to the slider 42, so that the pressure produced by the leading pad can be enhanced. Thus, the efficiency of skewed air trapping can be prevented from lowering.

In consequence, there may be obtained a head of improved reliability and stability, capable of improving operation shock resistance and reduced-pressure performance and suppressing a pressure drop despite a skew angle, a head suspension assembly provided with the head, and a disk device.

Figure 6:
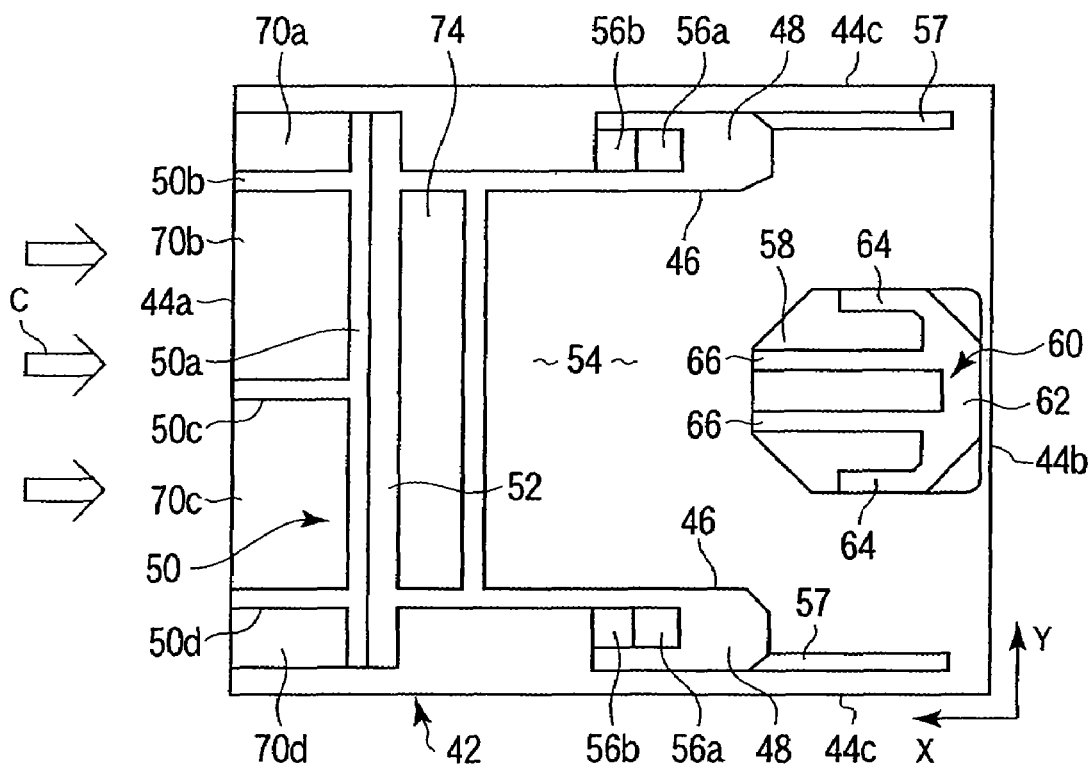
FIG. 6 is an exemplary plan view schematically showing the disk-facing surface side of a magnetic head according to a second embodiment of the invention.

FIG. 6 shows a disk-facing surface of a magnetic head 40 according to a second embodiment of this invention. The extended step portions of the leading step portion 50 are not limited to two in number and may be three. According to the second embodiment, the leading step portion 50 includes three extended step portions 50b, 50c and 50d that extend from the central part of a main step portion 50a with respect to the second direction Y to an inflow-side end face 44a. These extended step portions 50b, 50c and 50d extend in the first direction X and are spaced apart from one another in the second direction Y.

At the leading step portion 50, recesses 70a, 70b, 70c and 70d that are one level deeper than the leading step portion are formed on the opposite sides of the extended step portions. These recesses 70a, 70b, 70c and 70d are rectangular, for example, and are arranged side by side in the second direction Y. The recess 70a opens in a side face of the leading step portion 50 and the inflow-side end face 44a. The recess 70d opens in the opposite side face of the leading step portion 50 and the inflow-side end face 44a. The recesses 70b and 70c are situated between the recesses 70a and 70d and open in the inflow-side end face 44a.

Figure 7:
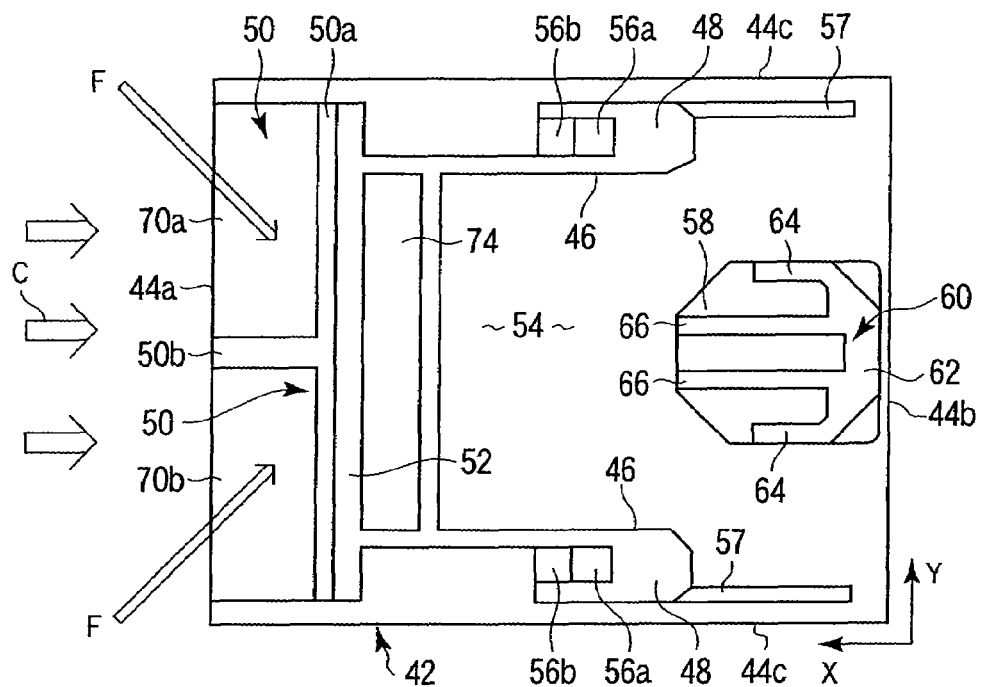
FIG. 7 is an exemplary plan view schematically showing the disk-facing surface side of a magnetic head according to a third embodiment of the invention.

FIG. 7 shows a disk-facing surface of a magnetic head 40 according to a third embodiment of this invention. According to the third embodiment, a leading step portion 50 includes one extended step portion 50b that extends from the central part of a main step portion 50a with respect to the second direction Y to an inflow-side end face 44a. The extended step portion 50b extends in the first direction X. At the leading step portion 50, recesses 70a and 70b are formed individually on the opposite sides of the extended step portion 50b.

Figure 8:
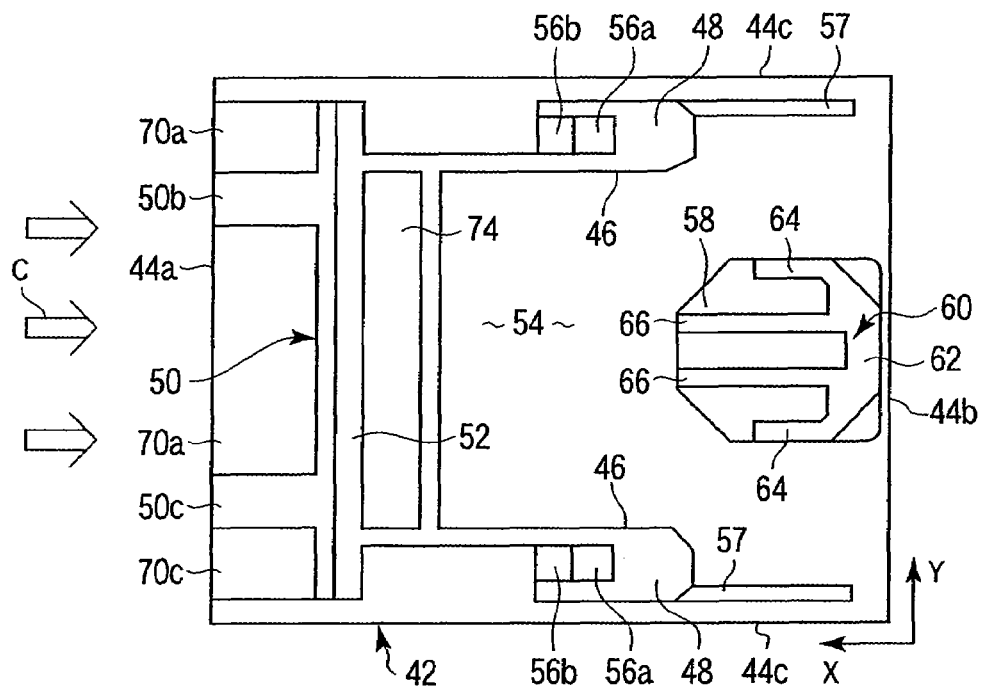
FIG. 8 is an exemplary plan view schematically showing the disk-facing surface side of a magnetic head according to a fourth embodiment of the invention.

FIG. 8 shows a disk-facing surface of a magnetic head 40 according to a fourth embodiment of this invention. Each of extended step portions 50b and 50c of a leading step portion 50 is wider than a main step portion 50a.

Figure 9:
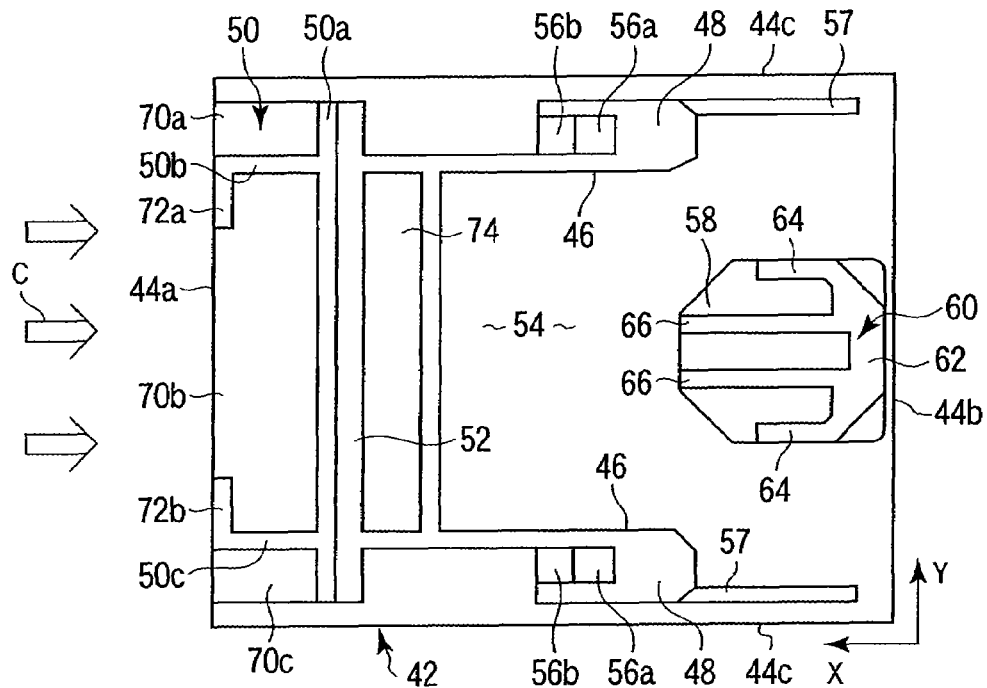
FIG. 9 is an exemplary plan view schematically showing the disk-facing surface side of a magnetic head according to a fifth embodiment of the invention.

FIG. 9 shows a disk-facing surface of a magnetic head 40 according to a fifth embodiment of this invention. According to the fifth embodiment, a leading step portion 50 includes a plurality of, e.g., two, extended step portions 50b and 50c that individually extend from a main step portion 50a to an inflow-side end face 44a and bent portions 72a and 72b that extend in the second direction Y from respective extended ends of the extended step portions, individually. The bent portions 72a and 72b extend toward each other.

Figure 10:
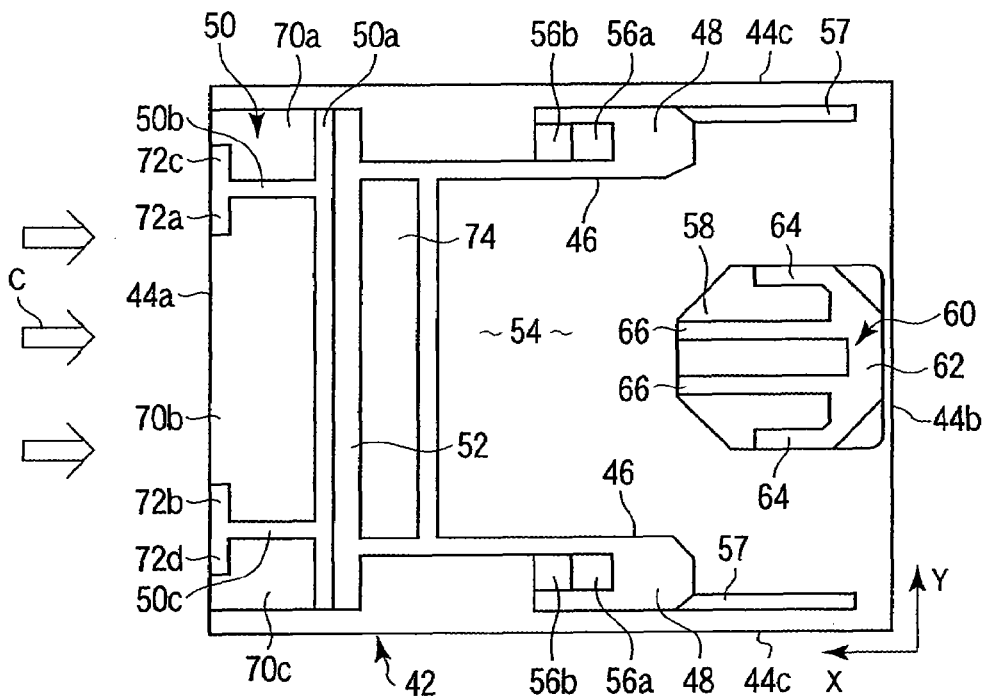
FIG. 10 is an exemplary plan view schematically showing the disk-facing surface side of a magnetic head according to a sixth embodiment of the invention.

FIG. 10 shows a disk-facing surface of a magnetic head 40 according to a sixth embodiment of this invention. According to the sixth embodiment, a leading step portion 50 includes a plurality of, e.g., two, extended step portions 50b and 50c that individually extend from a main step portion 50a to an inflow-side end face 44a and two pairs of bent portions 72a, 72b, 72c and 72d that extend oppositely in the second direction Y from respective extended ends of the extended step portions.

In the second to sixth embodiments, other configurations of the slider are the same as those of the foregoing first embodiment, so that like reference numbers are used to designate like portions, and a detailed description thereof is omitted.

The same functions and effects as those of the first embodiment can also be obtained from the second to sixth embodiments constructed in this manner. According to the fifth and sixth embodiments, moreover, the leading step portion includes the bent portions that further extend from the extended ends of the extended step portions. Thus, the leading step portion can more securely confine incoming air therein without releasing it, thereby enhancing the pressure produced by the leading pad.

While certain embodiments of the invention have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

The shapes, dimensions, etc., of the leading step portion, trailing step portion, and pads of the slider are not limited to the embodiments described herein and may be changed as required. The extended step portions and the recesses may be varied in number if necessary. The extended step portions may be designed to extend at an angle to the first direction instead of extending in the first direction. Further, the pocket recess may be omitted. This invention is not limited to femto sliders and may also be applied to pico sliders, pemto sliders, or any other larger sliders. The number of magnetic disks may be increased without being limited to one.

What is claimed is:

1. A head comprising:
   a slider which includes a facing surface opposed to a surface of a rotatable recording medium, an inflow-side end face extending transversely to the facing surface, and an outflow-side end face extending transversely to the facing surface and is configured to be flown by an air-flow which is produced between the recording medium surface and the facing surface as the recording medium rotates; and
   a head portion provided on the slider and configured to record and reproduce information to and from the recording medium,
   the facing surface of the slider including a first direction along the air-flow and a second direction perpendicular to the first direction,
   the slider comprising a negative-pressure cavity which is defined by a recess formed in the facing surface and produces a negative pressure; a leading step portion projecting with respect to the negative-pressure cavity and situated on the inflow side of the negative-pressure cavity with respect to the air-flow; a pair of side portions projecting with respect to the negative-pressure cavity, extending in the first direction from the leading step portion toward an outflow-side end of the slider, and opposed to each other with a space therebetween in the second direction; a trailing step portion projecting with respect to the negative-pressure cavity, situated on the outflow side of the negative-pressure cavity with respect to the air-flow, and having a top surface opposed to the recording medium; a leading pad provided on an end portion of the leading step portion on the negative-pressure cavity side; and a plurality of recesses which are formed on the inflow side of the leading pad and individually open in the inflow-side end face,
   the leading step portion including a main step portion which is situated beside the inflow side of the leading pad and extends in the second direction, a plurality of extended step portions extending in the first direction from the main step portion to the inflow-side end face and situated between the recesses, respectively, and a bent portion which extends in the second direction from an extended end of each of the extended step portions.

2. The head of claim 1, wherein the leading pad has a width of 30 µm or less in the first direction.

3. The head of claim 1, wherein the slider has a central axis extending in the first direction, and the recesses and the extended step portion or portions are formed symmetrically with respect to the central axis.

4. The head of claim 1, wherein the slider includes a pocket recess formed between the leading pad and an inflow-side end of the negative-pressure cavity.

5. A head suspension assembly used in a disk device which includes a disk recording medium and a drive section configured to support and rotate the recording medium, the head suspension assembly comprising:
   a head including a slider, which includes a facing surface opposed to a surface of the recording medium, an inflow-side end face extending transversely to the facing surface, and an outflow-side end face extending transversely to the facing surface and is configured to be flown by an air-flow which is produced between the recording medium surface and the facing surface as the recording medium rotates, and a head portion provided on the slider and configured to record and reproduce information to and from the recording medium; and
   a head suspension configured to support the head for movement with respect to the recording medium and apply a head load directed toward the surface of the recording medium to the head,
   the facing surface of the slider including a first direction along the air-flow and a second direction perpendicular to the first direction,
   the slider comprising a negative-pressure cavity which is defined by a recess formed in the facing surface and produces a negative pressure; a leading step portion projecting with respect to the negative-pressure cavity and situated on the inflow side of the negative-pressure cavity with respect to the air-flow; a pair of side portions projecting with respect to the negative-pressure cavity, extending in the first direction from the leading step portion toward an outflow-side end of the slider, and opposed to each other with a space therebetween in the second direction; a trailing step portion projecting with respect to the negative-pressure cavity, situated on the outflow side of the negative-pressure cavity with respect to the air-flow, and having a top surface opposed to the recording medium; a leading pad provided on an end portion of the leading step portion on the negative-pressure cavity side; and a plurality of recesses which are formed on the inflow side of the leading pad and individually open in the inflow-side end face,
   the leading step portion including a main step portion which is situated beside the inflow side of the leading pad and extends in the second direction, and at least one a plurality of extended step portions extending in the first direction from the main step portion to the inflow-side end face and situated between the recesses, respectively, and a bent portion which extends in the second direction from an extended end of each of the extended step portions.

6. A disk device comprising:
   a disk shaped recording medium;
   a drive section configured to support and rotate the recording medium;
   a head including a slider, which includes a facing surface opposed to a surface of the recording medium, an inflow-side end face extending transversely to the facing surface, and an outflow-side end face extending transversely to the facing surface and is configured to be flown by an air-flow which is produced between the recording medium surface and the facing surface as the recording medium rotates, and a head portion provided on the slider and configured to record and reproduce information to and from the recording medium; and
   a head suspension configured to support the head for movement with respect to the recording medium and apply a head load directed toward the surface of the recording medium to the head, the facing surface of the slider including a first direction along the air-flow and a second direction perpendicular to the first direction, the slider comprising a negative-pressure cavity which is defined by a recess formed in the facing surface and produces a negative pressure; a leading step portion projecting with respect to the negative-pressure cavity and situated on the inflow side of the negative-pressure cavity with respect to the air-flow; a pair of side portions projecting with respect to the negative-pressure cavity, extending in the first direction from the leading step portion toward an outflow-side end of the slider, and opposed to each other with a space therebetween in the second direction; a trailing step portion projecting with respect to the negative-pressure cavity, situated on the outflow side of the negative-pressure cavity with respect to the air-flow, and having a top surface opposed to the recording medium; a leading pad provided on an end portion of the leading step portion on the negative-pressure cavity side; and a plurality of recesses which are formed on the inflow side of the leading pad and individually open in the inflow-side end face, the leading step portion including a main step portion which is situated beside the inflow side of the leading pad and extends in the second direction, a plurality of extended step portions extending in the first direction from the main step portion to the inflow-side end face and situated between the recesses, respectively, and a bent portion which extends in the second direction from an extended end of each of the extended step portions.

* * * * *

UNITED STATES PATENT AND TRADEMARK OFFICE
CERTIFICATE OF CORRECTION

PATENT NO. : 7,719,794 B2  Page 1 of 1
APPLICATION NO. : 12/359955
DATED : May 18, 2010
INVENTOR(S) : Hanyu et al.

It is certified that error appears in the above-identified patent and that said Letters Patent is hereby corrected as shown below:

In column 10, lines 42-43, please replace "direction, and at least one a" with -- direction, a --.

Signed and Sealed this

Twenty-third Day of November, 2010

David J. Kappos
*Director of the United States Patent and Trademark Office*